United States Patent
Mongeau (10) Patent No.: US 10,915,920 B2
(45) Date of Patent: Feb. 9, 2021

(54) METHOD AND DIGITAL SIGNAGE PLAYER FOR MANAGING DISTRIBUTED DIGITAL SIGNAGE CONTENT

(71) Applicant: BROADSIGN SERV LLC, St. Louis, MO (US)

(72) Inventor: Bryan Mongeau, Beaconsfield (CA)

(73) Assignee: BROADSIGN SERV LLC, St. Louis, MO (US)

( * ) Notice: Subject to any disclaimer, the term of this patent is extended or adjusted under 35 U.S.C. 154(b) by 0 days.

(21) Appl. No.: 16/550,888

(22) Filed: Aug. 26, 2019

(65) Prior Publication Data
US 2019/0378160 A1 Dec. 12, 2019

Related U.S. Application Data (63) Continuation of application No. 15/137,076, filed on Apr. 25, 2016, now Pat. No. 10,740,783, and a
(Continued)

(51) Int. Cl.
*G06Q 30/02* (2012.01)
*G09F 7/00* (2006.01)
(Continued)

(52) U.S. Cl.
CPC ..... *G06Q 30/0241* (2013.01); *G06Q 30/0264* (2013.01); *G09F 7/00* (2013.01); *G09F 9/30* (2013.01); *G09G 5/12* (2013.01); *G09G 5/14* (2013.01); *G09G 2370/022* (2013.01); *G09G 2380/06* (2013.01); *H04L 12/18* (2013.01)

(58) Field of Classification Search
CPC .......................... G06Q 30/02; G06Q 30/0241
See application file for complete search history.

(56) References Cited

U.S. PATENT DOCUMENTS 9,202,234 B2    12/2015   Bourret et al.
9,836,762 B1 *  12/2017   Sivertsen ........... G06Q 30/0264
(Continued)

OTHER PUBLICATIONS

Sugiura et al., "Design and implementation of distributed and scalable multimedia signage system" (published in 2010 Second International Conference on Ubiquitous and Future Networks (ICUFN), pp. 273-278, Jun. 1, 2010) (Year: 2010).*

*Primary Examiner* — James M Detweiler
*Assistant Examiner* — Patrick Kim (57) ABSTRACT

A method and digital signage player for managing display of a distributed digital signage content. The digital signage player stores the distributed digital signage content, and a local placement target for the distributed digital signage content. The digital signage player displays the distributed digital signage content in accordance with the local placement target. The digital signage player exchanges messages with a neighbor digital signage player, for increasing the local placement target of the distributed digital signage content at the request of the neighbor digital signage player. The neighbor digital signage player also displays the distributed digital signage content in accordance with its own placement target, which needs to be decreased. The digital signage player ultimately increases the local placement target of the distributed digital signage content based on the messages exchanged with the neighbor digital signage player.

10 Claims, 8 Drawing Sheets

Related U.S. Application Data continuation of application No. 16/549,673, filed on Aug. 23, 2019.

(51) Int. Cl.
*G09G 5/12* (2006.01)
*G09F 9/30* (2006.01)
*G09G 5/14* (2006.01)
*H04L 12/18* (2006.01)

(56) References Cited

U.S. PATENT DOCUMENTS

| | | |
|---|---|---|
| 2005/0086695 A1 | 4/2005 | Keele et al. |
| 2009/0021708 A1 | 1/2009 | Boxmeer et al. |
| 2009/0106082 A1 | 4/2009 | Senti et al. |
| 2009/0204479 A1 | 8/2009 | Wolinsky |
| 2009/0217084 A1* | 8/2009 | Ebbert .................. G06F 3/1454 714/5.1 |
| 2011/0005500 A1 | 1/2011 | Asari et al. |
| 2011/0010732 A1 | 1/2011 | Opdycke |
| 2013/0015507 A1 | 1/2013 | Chidambarrao et al. |
| 2013/0155076 A1* | 6/2013 | Wodka ............... H04N 21/6582 345/502 |
| 2014/0222578 A1 | 8/2014 | Poornachandran et al. |

\* cited by examiner

METHOD AND DIGITAL SIGNAGE PLAYER FOR MANAGING DISTRIBUTED DIGITAL SIGNAGE CONTENT

TECHNICAL FIELD

The present disclosure relates to the field of digital signage. More specifically, the present disclosure presents a method and a digital signage player for managing distributed digital signage content.

BACKGROUND

Signage refers to graphic designs, such as symbols, emblems, words, etc. In advertising, signage refers to the design or use of signs and symbols to communicate a message to a specific group, usually for the purpose of marketing. Digital signage is a sub segment of signage and comprises the use of digital signage display units also referred to as digital signage players, such as liquid-crystal displays (LCDs), light-emitting diode (LED) displays, projector screens, etc. Digital signage is a field in great expansion especially for advertising in a public venue (e.g. an airport, a shopping mall, etc.), because of the potential to advertise dynamically, such as is done with an advertising video.

Several digital signage players may be displaying the same digital signage content, referred to as a distributed digital signage content since it is distributed over the plurality of digital signage players. Each particular digital signage player has its own local placement target, determining how often the distributed digital signage content is played on a display of the particular digital signage player.

However, in some circumstances such as a failure of a specific one of the digital signage players or digital signage content which takes precedence, the local placement target cannot be achieved by the specific digital signage player. By managing the distributed digital signage content in a dynamic manner over the plurality of digital signage players, the local placement targets can be adapted to various circumstances affecting one or more of the digital signage players.

Therefore, there is a need for a new method and digital signage player for managing distributed digital signage content.

SUMMARY

According to a first aspect, the present disclosure provides a method for managing distributed digital signage content. The method comprises storing in a memory of a digital signage player: a distributed digital signage content, a distributed digital signage content identifier for identifying the distributed digital signal content, and a local placement target for the distributed digital signage content. The method comprises displaying, by a processing unit of the digital signage player, the distributed digital signage content on a display of the digital signage player in accordance with the local placement target. The method comprises exchanging, via a communication interface of the digital signage player, synchronization data related to the distributed digital signage content with at least one of a digital signage server and neighbor digital signage player. The synchronization data comprise the distributed digital signage content identifier. The method comprises increasing or decreasing, by the processing unit, the local placement target based on the synchronization data exchanged.

According to a second aspect, the present disclosure provides a non-transitory computer program product comprising instructions deliverable via an electronically-readable media, such as storage media and communication links. The instruction, when executed by a processing unit of a digital signage player, provide for managing distributed digital signage content according to the aforementioned method.

According to a third aspect, the present disclosure provides a digital signage player adapted for managing distributed digital signage content. The digital signage player comprises memory for storing: a distributed digital signage content, a distributed digital signage content identifier for identifying the distributed digital signal content, and a local placement target for the distributed digital signage content. The digital signage player comprises a communication interface for exchanging synchronization data related to the distributed digital signage content with at least one of a digital signage server and neighbor digital signage player. The synchronization data comprise the distributed digital signage content identifier. The digital signage player comprises a display for displaying the distributed digital signage content. The digital signage player comprises a processing unit for displaying the distributed digital signage content on the display in accordance with the local placement target. The processing unit further provides for increasing or decreasing the local placement target based on the synchronization data exchanged.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the distribution of digital signage content displayed on the plurality of digital signage players.

Referring now concurrently to FIGS. 1, 2, 3 and 4, a digital signage server 100 and a plurality of digital signage players 200 are represented.

Figure 2:
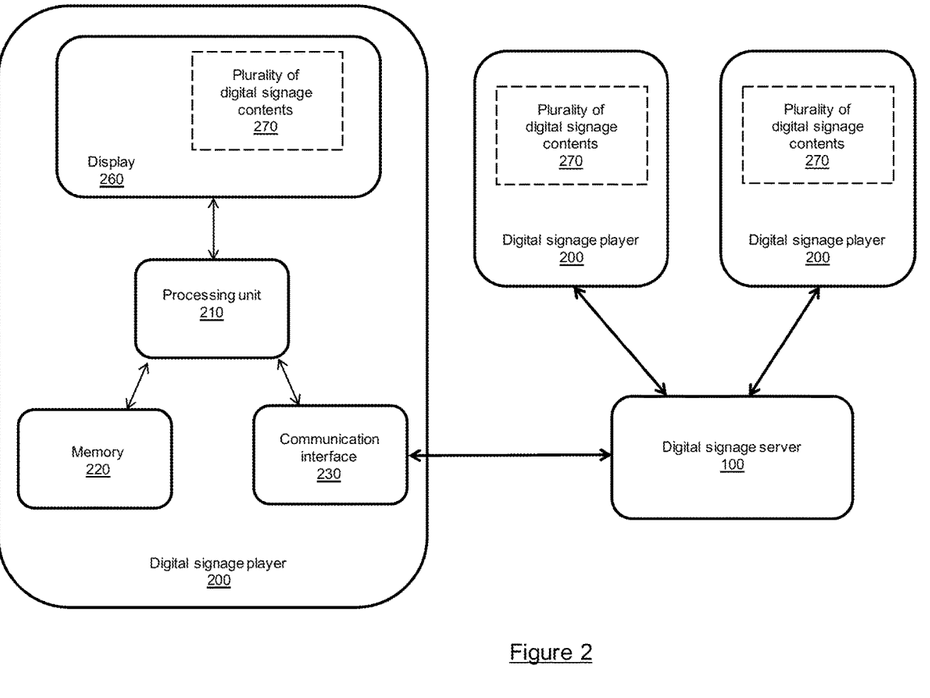
FIG. 2 represents details of one of the digital signage players of FIG. 1.

Referring more particularly to FIG. 2, details of one of the digital signage players 200 are illustrated.

The digital signage player 200 comprises a processing unit 210. The processing unit 210 comprises one or more processors (not represented in FIG. 2) capable of executing instructions of computer program(s) for performing the functionalities of the digital signage player 200 (receiving data, processing the received data, generating data, transmitting the generated data, etc.). Each processor may further have one or several cores.

The digital signage player 200 comprises memory 220. The memory 220 stores instructions of the computer program(s) executed by the processing unit 210, data generated by the execution of the computer program(s), data received from a communication interface 230, etc. The digital signage player 200 may comprise several types of memories, including volatile memory, non-volatile memory, etc.

Figure 4:
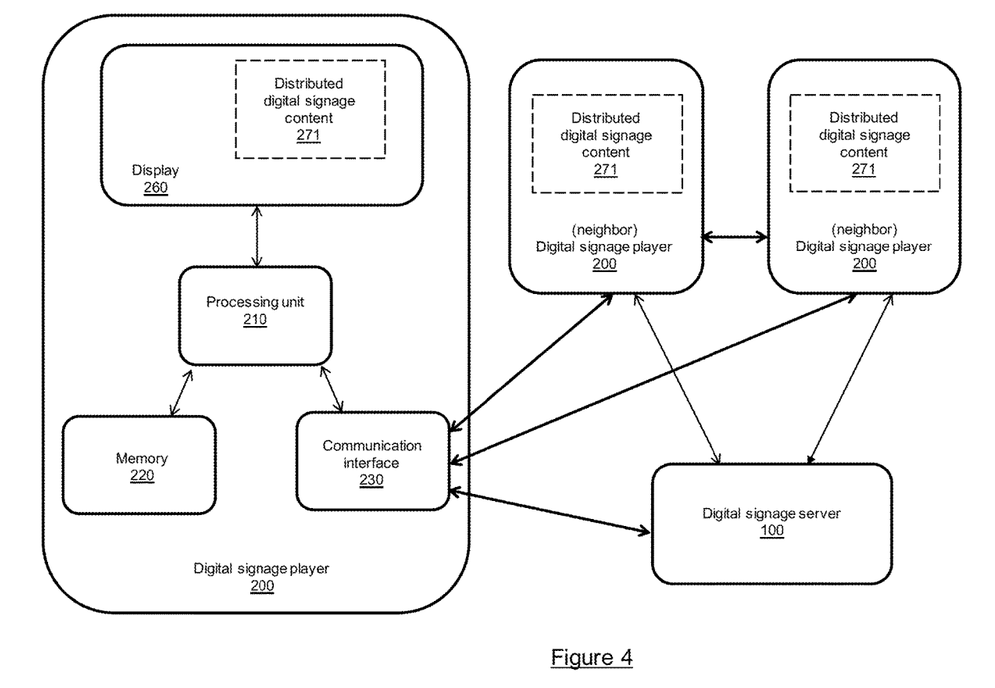
FIG. 4 represents the digital signage players of FIG. 2 interacting with each other and/or with the digital signage server for managing a distributed digital signage content.

The digital signage player 200 comprises the communication interface 230. The communication interface 230 allows the digital signage player 200 to exchange data with the digital signage server 100, and with other computing devices such as neighbor digital signage players 200 (as illustrated in FIG. 4). The communication interface 230 supports one or several of the following communication technologies: fixed broadband, Ethernet, cellular, Wi-Fi, mesh, Bluetooth, a combination thereof, etc. For example, the digital signage player 200 communicates with the digital signage server 100 via a cellular network or a fixed broadband network, and communicates with neighbor digital signage players 200 (as illustrated in FIG. 4) via a Wi-Fi network.

The digital signage player 200 comprises a display 260. A single display 260 is represented in FIG. 2. However the digital signage player 200 may comprise several displays 260. The display(s) 260 consists of, without limitations, a liquid-crystal display (LCD), a light-emitting diode (LED) display, an organic light-emitting diode (OLED) display, a projector screen, a combination thereof, etc. At least some of the displays 260 may have a large screen, to be visible by a large crowd. The digital signage player 200 is usually located in a public venue (e.g. an airport, a shopping mall, etc.), so that a large number of persons located close to the digital signage player 200 can see a content displayed on its display 260.

Figure 3:
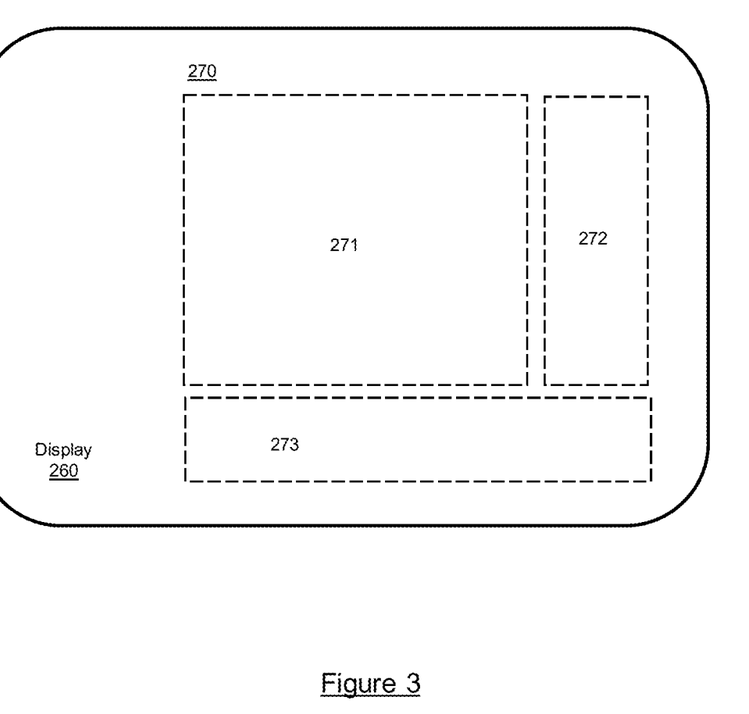
FIG. 3 represents an exemplary digital signage content displayed by one of the digital signage players of FIG. 2.

FIG. 3 illustrates a display 260 of one of the digital signage players 200 of FIG. 2 displaying a plurality of digital signage contents 270. For example, a first digital signage content 271 comprises a larger video image, a second digital signage content 272 comprises a series of static images (such as a local weather report or a Quick Response (QR) code), and a third digital signage content 273 comprises a banner of different series of static images. For any digital signage player 200, at any point in time, the plurality of digital signage contents 270 displayed by its display 260 may include advertising in the form of still or video images, or other contents of interest. The arrangement of the plurality of digital signage contents 270 represented in FIG. 3 varies. For instance, different numbers of digital signage contents 270 are displayed in different orientations. Moreover, the number of digital signage contents 270 and their respective orientations varies temporally.

Figure 1:
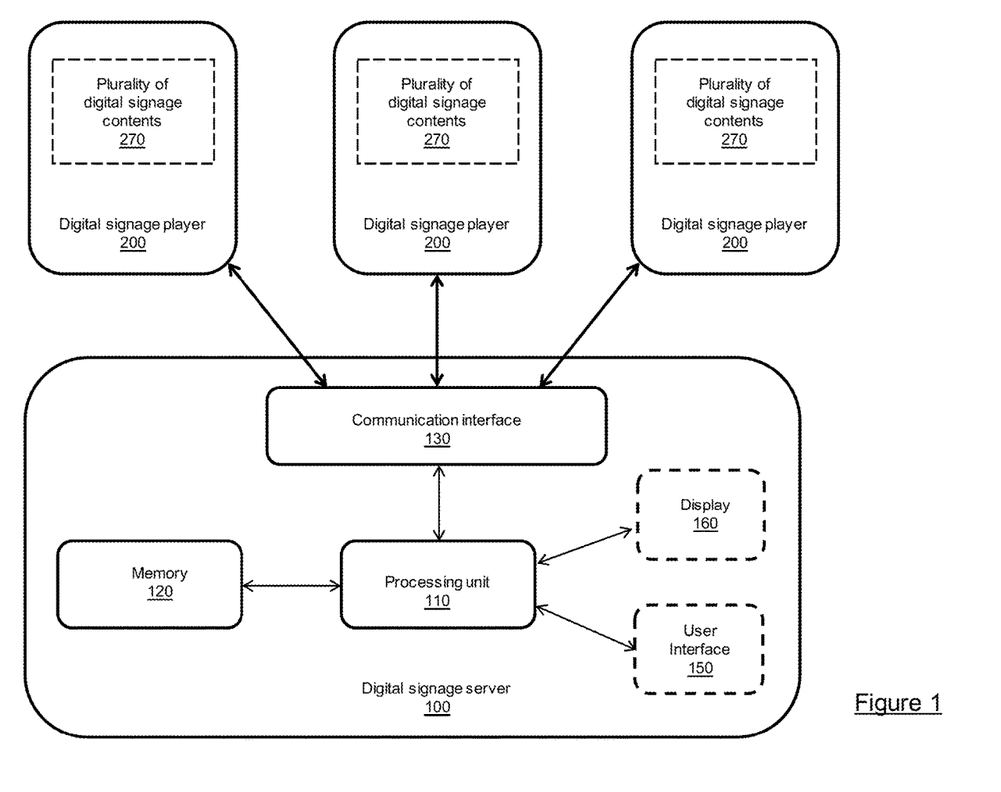
FIG. 1 represents a digital signage server interacting with a plurality of digital signage players.

Referring now more particularly to FIG. 1, details of the digital signage server 100 are illustrated.

For the purpose of clarity, only a single digital signage server 100 is represented in FIG. 1, but the digital signage server 100 may consist of a cluster of generic purpose computers or a cluster of high performance specialized computers.

The digital signage server 100 comprises a processing unit 110. The processing unit 110 comprises one or more processors (not represented in FIG. 1) capable of executing instructions of computer program(s)) for performing the functionalities of the digital signage server 100 (receiving data, processing the received data, generating data, transmitting the generated data, etc.). Each processor may further have one or several cores.

The digital signage server 100 comprises memory 120. The memory 120 stores instructions of the computer program(s) executed by the processing unit 110, data generated by the execution of the computer program(s), data received from a communication interface 130, etc. The digital signage server 100 may comprise several types of memories, including volatile memory, non-volatile memory, etc.

The digital signage server 100 comprises the communication interface 130. The communication interface 130 allows the digital signage server 100 to exchange data with the digital signage players 200, and with other computing devices if needed. The communication interface 130 supports at least one of the following communication technologies: fixed broadband, Ethernet, cellular, Wi-Fi, mesh, Bluetooth, a combination thereof, etc. For example, as mentioned previously, the digital signage server 100 communicates with the digital signage players 200 via a cellular network or a fixed broadband network.

The digital signage server 100 may also comprise a user interface 150 (e.g. a keyboard, a mouse, a touchscreen, etc.), and a display 160 (e.g. a standard screen, a touchscreen, etc.).

Figure 5:
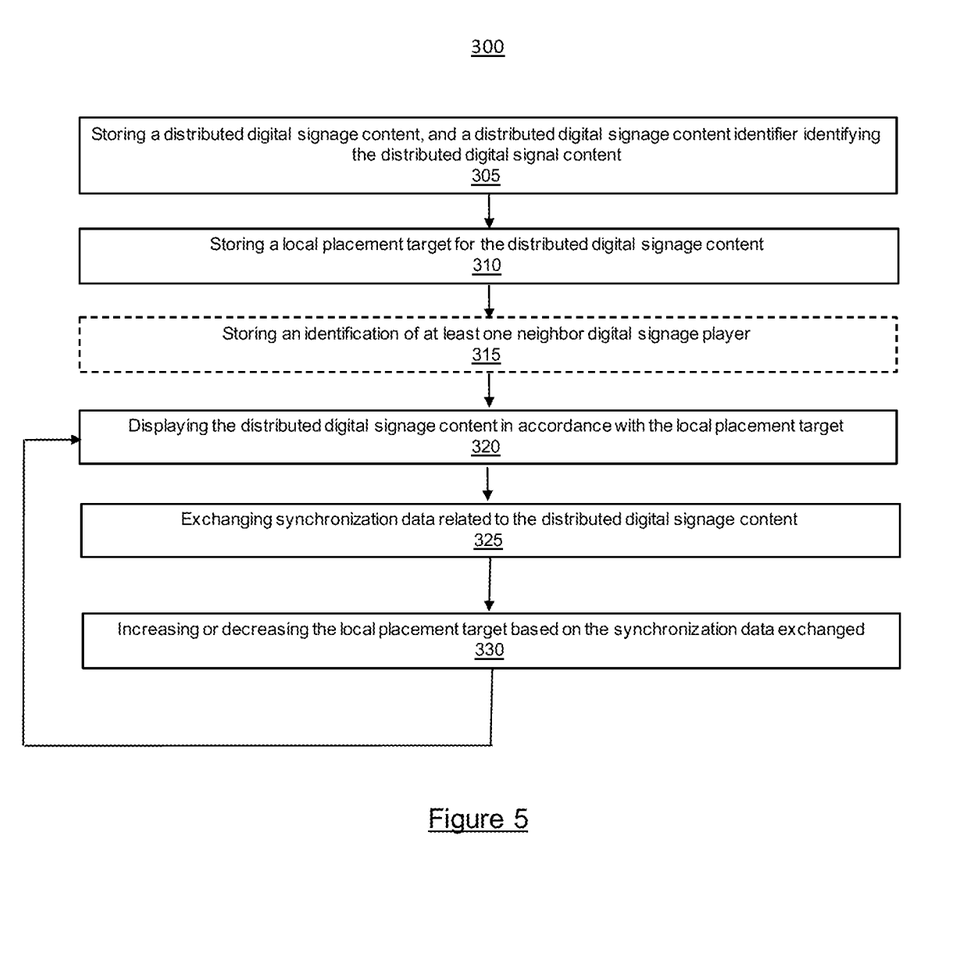
FIG. 5 represents a method implemented by each one of the digital signage players of FIG. 4 for managing a distributed digital signage content.

Referring now concurrently to FIGS. 4 and 5, a method 300 for managing distributed digital signage content is illustrated in FIG. 4. The method 300 is implemented by each one of the digital signage players 200 and digital signage server 100 involved in the distributed placement of a distributed digital signage content.

A specific computer program has instructions for implementing the steps of the method 300. The instructions are comprised in a non-transitory computer program product (e.g. the memory 220). The instructions provide for managing distributed digital signage content, when executed by the processing unit 210 of one of the digital signage players 200. The instructions are deliverable via an electronically-readable media, such as a storage media (e.g. a USB key), or via communication links (e.g. a Wi-Fi or cellular network) through the communication interface 230 of the digital signage player 200.

The method 300 comprises the step 305 of storing in the memory 220 a distributed digital signage content, and a distributed digital signage content identifier for identifying the distributed digital signal content.

The processing unit 210 receives the distributed digital signage content and the corresponding distributed digital signage content identifier via the communication interface 230 from the digital signage server 100. The processing unit 210 further stores the received distributed digital signage content and distributed digital signage content identifier in the memory 220.

The distributed digital signage content is a digital content (e.g. video, picture, etc.) which is to be displayed on the display 260. The corresponding distributed digital signage content identifier is an identifier used for identifying and differentiating the digital content from other digital contents.

The distributed digital signage content refers to a particular digital signage content, which is displayed over a plurality of digital signage players 200 in an optimized manner. More specifically, the method 300 optimizes the placing of the distributed digital signage content dynamically and in real time over the plurality of digital signage players 200, to provide an optimal exposition to the distributed digital media content for end users in a viewing range of the plurality of digital signage players 200, and to ensure that exposition commitments to digital signage content clients are met.

By opposition, prior art local digital signage content is managed locally by a digital signage player 200, without dynamic and real time synchronization with at least one of the digital signage server 100 and other digital signage players 200.

Using the present invention, a particular digital signage player 200 is capable of simultaneously managing local digital signage content(s) (in a manner well known in the art of digital signage) and distributed digital signage content(s) (by applying the method 300). For example, in FIG. 3, the content 271 is a distributed digital signage content, while the contents 272 and 273 are local digital signage contents.

For illustration purposes, FIG. 4 represents the digital signage server 100 and/or three digital signage players 200 cooperating for optimizing the placement of the distributed digital signage content 271. However, any number (at least two) of digital signage players 200 may cooperate for optimizing the placement of the distributed digital signage content 271, each one of the digital signage players 200 executing the method 300.

The digital signage server 100 manages the digital signage contents to be displayed by the digital signage players 200 under its control. Although only three digital signage players 200 are controlled by the digital signage server 100 in FIGS. 1 and 2, any number of digital signage players 200 may be controlled by the digital signage server 100.

The digital signage server 100 determines if a particular digital signage content shall be distributed over a plurality of players 200 or managed locally by a single player 200. This information is transmitted (along with the particular digital signage content) by the digital signage server 100 and stored in the memory 220 of the player(s) 200 responsible for displaying the particular digital signage content.

The digital signage server 100 generates the identifier of the particular digital signage content. The identifier is used for uniquely identifying the particular digital signage content among all the digital signage contents currently managed by the digital signage server 100, for display on the plurality of digital signage players 200 under its control. The identifier may include an indication that the particular digital signage content is distributed or locally managed.

The method 300 comprises the step 310 of storing in the memory 220 a local placement target for the distributed digital signage content 271. The local placement target is used to determine how often the distributed digital signage content 271 is displayed on the display 260. For instance, the local placement target is: a frequency of display of the distributed digital signage content 271, a number of iterations the distributed digital signage content 271 is to be displayed over a predetermined time, or any other type of local placement target. The frequency of display may be an hourly frequency, a daily frequency, a frequency defined for a specific period of time, etc.

The processing unit 210 receives an initial value of the local placement target via the communication interface 230 from the digital signage server 100. The processing unit 210 further stores the initial value of the local placement target in the memory 220. The initial value of the local placement target for the distributed digital signage content 271 is determined by the digital signage server 100, taking into consideration placement targets for other digital signage contents to be displayed, economic criteria, etc. Alternatively, or concurrently, the initial value of the local placement target is negotiated with other digital signage players 200 also displaying the distributed digital signage content 271, as will be illustrated later in the description.

The method 300 may optionally comprise the step 315 of storing in the memory 220 an identification of at least one neighbor digital signage player 200.

The digital signage player 200 interact with the digital signage server 100 for the optimized placement of the distributed digital signage content 271. The digital signage player 200 is further adapted for directly communicating with the neighbor digital signage players 200 for the optimized placement of the distributed digital signage content 271. In FIG. 4, the currently described digital signage player 200 is on the left side of the figure, while the two neighbor digital signage players 200 are on the right side of the figure. As can be seen on FIG. 4, the currently described digital signage player 200 directly communicates with the digital signage server 100 and with the neighbor digital signage players 200 depicted on the upper right hand-side of the Figure. Although the present description is focused on the digital signage player 200, those skilled in the art will understand that the present description applies to any digital signage player 200, either the currently described digital signage player or the neighbor digital signage players 200.

The identification of the neighbor digital signage player 200 generally consists of a logical identifier, which is mapped to a networking identifier (e.g. an Internet Protocol (IP) address, a Domain Name Server (DNS) name, etc.). The networking identifier allows an exchange of data via the communication interface 230 with the corresponding neighbor digital signage player 200. The logical identifier provides a level of abstraction with respect to the communication infrastructure (e.g. an IP based Wi-Fi network) used for exchanging data between the digital signage players 200, and with the digital signage server 100. The logical identifier is unique among the digital signage players 200, either being under the control of the digital signage server 100 or under the control of another digital signage server (not shown) in a network of digital signage players 200.

A list of digital signage player(s) 200 is defined for each particular distributed digital signage content (e.g. 271), allowing the distributed placement of digital signage contents over different digital signage players 200. Each list consists of the one or more logical identifier(s) of the one or more digital signage player(s) 200 associated with the particular distributed digital signage content (e.g. 271).

Each list is generated by the digital signal server 100 and stored in the memory of the digital signage server 100. Each list is further transmitted to the corresponding digital signage players 200 for storage in their memory 220. An updated list may be generated by the digital signal server 100 and transmitted to the corresponding digital signage players 200, if the conditions defining the distributed placement of the related distributed digital signage content (e.g. 271) evolve.

For example, a particular distributed digital signage content is distributed between three digital signage players 200 identified by their respective logical identifiers A, B and C. The digital signage server 100 respectively generates and transmits list (B,C) to digital signage player A, list (A,C) to digital signage player B, and list (A,B) to digital signage player C.

Alternatively, a single list of one or more neighbor digital signage player(s) 200 is defined for all the distributed digital signage content (e.g. 271) displayed on the display 260, so that the distributed placement of all the distributed digital signage contents is performed over the same set of digital signage players 200. As mentioned previously, the single list is generated at the digital signal server 100 and transmitted to the digital signage players 200. Alternatively, or concurrently, the single list may also be configured directly at the digital signage players 200.

The method 300 comprises the step 320 of displaying by the processing unit 210 the distributed digital signage content 271 on the display 260 in accordance with the local placement target stored in the memory 220.

As mentioned previously, a plurality of digital signage contents is displayed sequentially on the display 260, each particular digital signage content having its own constraints in terms of placement. The processing unit 210 takes into consideration the constraints related to the plurality of digital signage contents to determine an appropriate sequence for displaying the plurality of digital signage contents on the display 260. In particular, with respect to the distributed digital signage content 271, the processing unit 210 takes into consideration its local placement target and the constraints related to the other digital signage contents to be displayed, to determine when the distributed digital signage content 271 is displayed on the display 260. For example, if the local placement target of the distributed digital signage content 271 is three times per hour, a variety of sequences of placement could be determined, such as: every twenty minutes; at 10, 30 and 45 minutes within each hour; etc.

The method 300 comprises the step 325 of exchanging via the communication interface 230 synchronization data related to the distributed digital signage content 271 with the digital signage server 100. Alternatively, and or concurrently, the method 300 comprises at step 325 exchanging via the communication interface 230 synchronization data related to the distribute digital signage content 271 with at least one neighbor digital signage player 200 identified at step 315. The synchronization data comprise the distributed digital signage content identifier of the distributed digital signage content 271 for identification purposes.

Examples of synchronization data will be detailed later in the description. The exchange of synchronization data is performed in real time with the digital signage server 100 and alternatively or concurrently with the neighbor digital signage player(s) 200, to dynamically adapt the local placement target of the distributed digital signage content 271, based on a capacity of at least one neighbor digital signage player(s) 200 to adapt its own local placement target of the distributed digital signage content 271 either determined directly or through the digital signage server 100.

The method 300 comprises the step 330 of increasing or decreasing by the processing unit 210 the local placement target of the distributed digital signage content 271, based on the synchronization data exchanged at step 325.

For example, if the current digital signage player 200 needs to decrease its local placement target and one of the neighbor digital signage player(s) 200 is capable of increasing its own local placement target (according to the exchanged synchronization data), then the current digital signage player 200 effectively decreases its local placement target accordingly. Similarly, if the current digital signage player 200 is capable of increasing its local placement target and one of the neighbor digital signage player(s) 200 needs to decrease its own local placement target (according to the exchanged synchronization data), then the current digital signage player 200 effectively increases its local placement target accordingly.

The updated local placement target of the distributed digital signage content 271 is stored in the memory 220 by the processing unit 210. Following step 330, step 320 is performed taking into consideration the updated local placement target.

Figure 6:
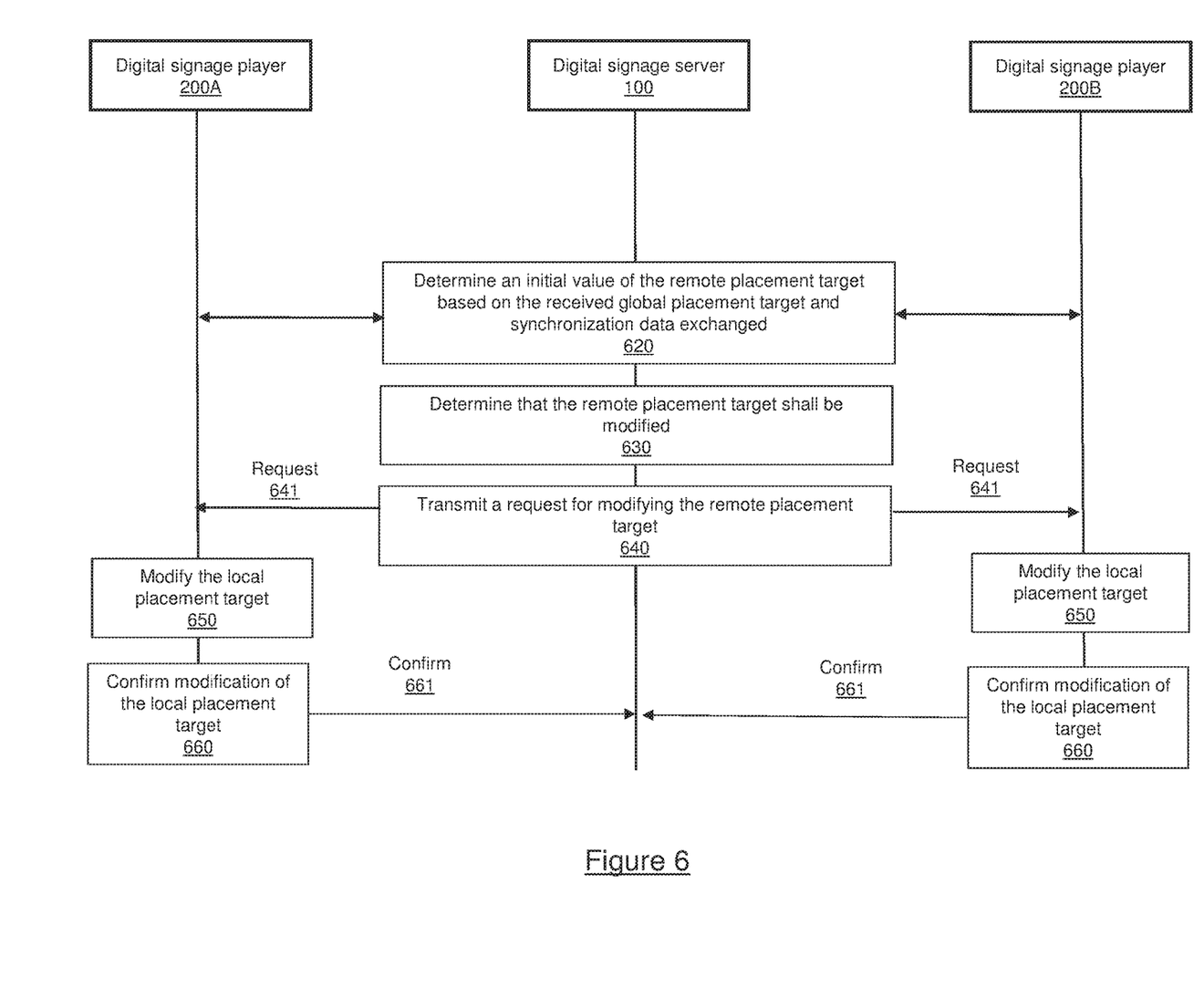
FIG. 6 represents an example of interactions between the digital signage players of FIG. 4 and the digital signage server for managing a distributed digital signage content.

Referring now concurrently to FIGS. 4, 5 and 6, a first example of synchronization data exchanged at step 325 of the method 300 will be detailed. In this first example, step 330 of the method 300 consists in an increase or a decrease of the local placement target following the exchange of synchronization data.

FIG. 6 illustrates steps of an exchange of synchronization data between digital signage players 200A and 200B, and the digital signage server 100. In FIG. 6, the digital signage server 100 coordinates distribution of the global placement target amongst the plurality of digital signage players 200A and 200B for which it is responsible. Although only two digital signage players 200A and 200B are depicted on FIG. 6 and described herein, those skilled in the art will understand that the present method, digital signage server and digital signage players are not limited to such a number, and that two digital signage players 200A and 200B are shown for example and simplification purposes only.

At step 620, the processing unit 110 of the digital signage server 100 determines an initial value of the remote placement target at the digital signage player(s) 200A and 200B. The initial value of the remote placement target for each digital signage player 200A and 200B is based on a received global placement target. The initial value of the remote placement target for each digital signage player 200A and 200B may further be based on synchronization data exchanged by the digital signage server 100 with the digital signage players 200A and 200B. Furthermore, the initial value of the remote placement target for each digital signage player 200A and 200B may be different.

Then, at step 630, the processing unit 110 of the digital signage server 100 determines that the remote placement target of the distributed digital signage content 271 at the digital signage players 200A and 200B shall be modified (i.e. decreased or increased), based on, for example, operating conditions of the digital signage players 200A and 200B, synchronization data exchanged with the digital signage players 200A and 200B or receipt of a change of global placement target, or because of any other criteria or situation which requires the digital signage server 100 to modify the remote placement target.

For example, the operating conditions may consist in a failure of one of the digital signage players 200A and 200B amongst which the global placement target is distributed as remote placement targets. During the failure, one or more scheduled displays of the distributed digital signage content 271 on the display 260 have not been performed. When the local placement target cannot be achieved due to any reasons, i.e. the frequency or distribution over time of the digital signage content 271 can no longer be changed to meet the local placement target, the local placement target must be modified and one of the remote placement targets must be increased accordingly.

The previous examples of determination the the remote placement target shall be modified at step 630 are for illustration purposes only. A person skilled in the art will readily understand that other types of conditions may lead to a need for modifying the local placement target of the distributed digital signage content 271, at one digital signage player or several digital signage players concurrently.

At step 640, the processing unit 110 of the digital signage server 100 transmits via the communication interface 130 a request 641 for modifying a remote placement target for the distributed digital signage content 271. The request 641 is transmitted to one or several digital signage players 200A and 200B. A broadcasting protocol can be used for simultaneously transmitting the request 641 to a plurality of digital signage players 200A and 200B.

The request 641 for modifying the remote placement target comprises the identifier of the distributed digital signage content 271 along with a revised local placement target. The request 641 is received by the communication interface 230 of the digital signage players 200A and 200B to which the request 641 was transmitted. The communication interface 230 of each digital signage players 200A and 200B to which the request was transmitted transfers the received request 641 to the corresponding processing unit 210 for processing. In step 650, the process unit 210 of the digital signage player 200A and 200B which received the request 641 store the revised local placement for the distributed digital signage content 271 in memory 220 and modifies the local placement target of the distributed digital signage content 271 accordingly. In step 660, the processing unit 210 of the digital signage players 200A and 200B which received the request 641 further generates a confirmation message 661 sent to the digital signage server 100 confirming that the local placement target for the distributed digital signage content 271 has been modified. The confirmation message 661 includes the identifier of the distributed digital signage content 271, along with the revised local target placement.

Figure 7:
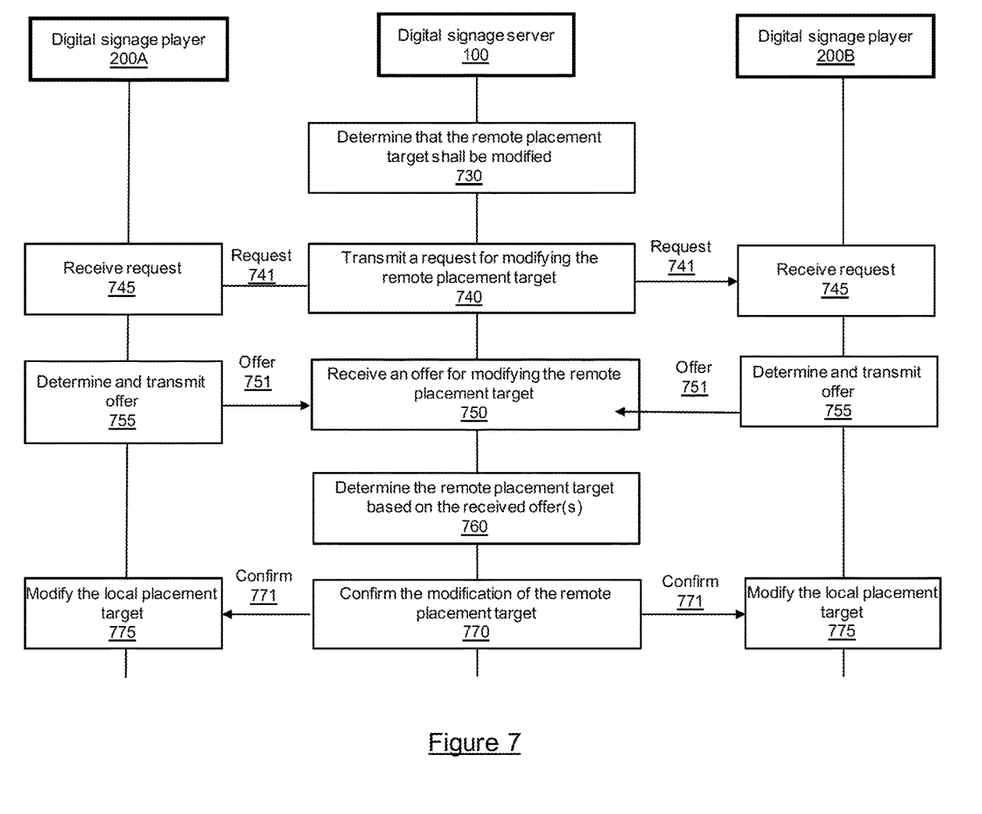
FIG. 7 represents another example of interactions between the digital signage players of FIG. 4 and the digital signage server for managing a distributed digital signage content.

Referring now concurrently to FIGS. 4, 5 and 7, a second example of synchronization data exchanged at step 325 of the method 300 will be detailed. In this second example, step 330 of the method 300 consists in an increase or a decrease of the local placement target following the exchange of synchronization data.

FIG. 7 illustrates steps of an exchange of synchronization data between digital signage players 200A and 200B, and the digital signage server 100. In FIG. 7, the digital signage server 100 coordinates distribution of the global placement target amongst the plurality of digital signage players 200A and 200B for which it is responsible. More particularly in the example illustrated on FIG. 7, the relationship between the digital signage server 100 and the digital signage players 200A and 200B is a collaborative effort, i.e. the digital signage server 100 makes requests, the digital signage servers 200A and 200B reply with offers, and the digital signage server 100 confirms the acceptance or refusal of the offers received from the digital signage players 200A and 200B. Although only two digital signage players 200A and 200B are depicted on FIG. 7 and described herein, those skilled in the art will understand that the present method, digital signage server and digital signage players are not limited to such a number, and that two digital signage players 200A and 200B are shown for example and simplification purposes only.

At step 730, the processing unit 110 of the digital signage server 100 determines that the remote placement target of the distributed digital signage content 271 at the digital signage players 200A and 200B shall be modified (i.e. decreased or increased), based on, for example, operating conditions of the digital signage players 200A and 200B, synchronization data exchanged with the digital signage players 200A and 200B or receipt of a change of global placement target, or because of any other criteria or situation which requires the digital signage server 100 to modify the remote placement target, as previously discussed.

At step 740, the processing unit 110 of the digital signage server 100 transmits via the communication interface 130 a request 741 for modifying a remote placement target for the distributed digital signage content 271. The request 741 is transmitted to one or several digital signage players 200A and 200B. A broadcasting protocol can be used for simultaneously transmitting the request 741 to a plurality of digital signage players 200A and 200B.

The request 741 for modifying the remote placement target comprises the identifier of the distributed digital signage content 271 along with a request for providing a revised local placement target. The request 741 is received in step 745 by the communication interface 230 of the digital signage players 200A and 200B to which the request 741 was transmitted. The communication interface 230 of each digital signage players 200A and 200B to which the request was transmitted transfers the received request 741 to the corresponding processing unit 210 for processing. In step 755, the processing unit 210 of the digital signage player 200A and 200B analyzes the received request 741 and determines an offer of local placement target to be submitted to the digital signage server 100. Each processing unit 210 of each digital signage player 200A and 200B determines the offer it can submit to the digital signage server 100 as local placement target for the distributed digital signage content 271. The processing unit 210 determines the offer based on its operating parameters, the local placement target already committed to. The digital signage players 200A and 200B transmit their offer 751 to the digital signage server 100. The offer 751 of the digital signage player 200A is independently determined from the offer 751 transmitted by the digital signage player 200B.

The digital signage server 100 receives by means of the communication interface 130 the offers 751 from the digital signage players 200A and 200B, in step 750. The digital signage server 100 then determines the remote placement target for the distributed digital signage content 271 at the digital signage players 200A and 200B based on the received offers 751, in step 760. The digital signage server then stores in memory 120 the revised remote placement target for the distributed digital signage content 271 at the digital signage players 200A and 200B, and confirms the modification of the remote placement target for the distributed digital signage content 271 with the digital signage players 200A and 200B in step 770, by sending a confirm message 771. The confirm message 771 is received by the communication interface 230 of the digital signage players 200A and 200B. The digital signage players 200A and 200B store in memory 220 the received modified placement target to be applied locally for the distributed digital signage content 271, and the processing unit 210 of the digital signage players 200A and 200B proceed with modifying the local placement target for the distributed digital signage content 271 in step 775.

Referring now concurrently to FIGS. 4, 5, 6, 7 and 8, a third example of synchronization data exchanged at step 325 of the method 300 will be detailed. In this third example, step 330 of the method 300 consists in an increase or a decrease of the local placement target following the exchange of synchronization data.

Figure 8:
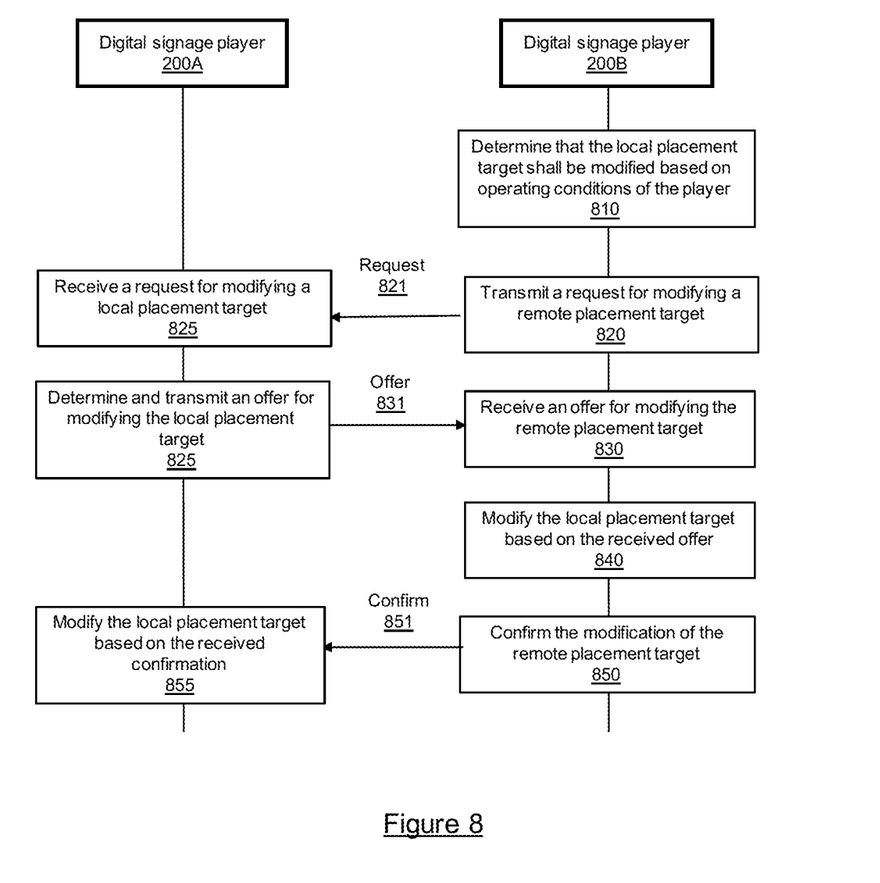
FIG. 8 represents still another example of interactions between the digital signage players of FIG. 4 for managing a distributed digital signage content.

More specifically, FIG. 8 illustrates steps of an exchange of synchronization data between digital signage players 200A and 200B without the involvement the digital signage server 100. Thus the present method, digital signage players 200A and 200B and digital signage server 100 support complete supervision by the digital signage server 100 (shown on FIG. 6), collaboration between the digital signage players 200A and 200B with the digital signage server 100 for the coordination of the local placement target for the distributed digital signage content 271 (shown on FIG. 7), and/or the coordination of the local placement target for the distributed digital signage content 271 between the digital signage players 200A and 200B without the involvement of the digital signage server 100 (shown on FIG. 8).

One of the digital signage players, namely digital signage player 200B on FIG. 8, determines in step 810 that the local placement target must be modified. The determination may be based on the operating conditions of the digital signage player 200B or any other criteria as previously discussed. The processing unit 210 of the digital signage player 200B generates a request for modifying a remote placement target of the other digital signage player 200A for the distributed digital signage content 271. The processing unit 210 of the digital signage player 200B transmits through the communication interface 230 a request 821 in step 820, which contains the identification of the digital signage content 271, and the request for the modification of the corresponding local placement target at the digital signage player 200A.

The request 821 is received by the communication interface 230 of the digital signage player 200A in step 825. The communication interface 230 of the digital signage player 200A forwards the received request 821 to the corresponding processing unit 210. The processing unit 210 of the digital signage player 200A processes the received request 821, and determines an offer for modifying the local placement target for the distributed digital signage content 271 at the digital signage player 200A at step 825. The determination of the offer is performed based on operating conditions of the digital signage player 200A, the current local placement targets committed to, etc. The processing unit 210 of the digital signage player 200A transmits an offer 831 to the digital signage player 200B. The offer 831 includes the identification of the distributed digital signage content 271 and the proposed modification to the local placement target for the distributed digital signage content 271 at the digital signage player 200A.

The communication interface 230 of the digital signage player 200B receives the offer 831 in step 830. The offer 831 received by the communication interface 230 of the digital signage player 200B is transferred to the processing unit 210 of the digital signage player 200B.

Although only two digital signage players 200A and 200B are depicted on FIG. 7 and described herein, those skilled in the art will understand that the present method, digital signage server and digital signage players are not limited to such a number, and that two digital signage players 200A and 200B are shown for example and simplification purposes only.

At step 840, the processing unit 210 of the digital signage player 200B confirms whether the local placement target for the distributed digital signage content 271 at the digital signage player 200B can be modified based on the received offer 831. If the processing unit 210 of the digital signage player 200B determines that the local placement target for the distributed digital signage content 271 can be modified based on the received offer 831, the method pursues with step 850. In step 850, the digital signage player 200B stores in memory 220 the modified local placement target for the distributed digital signage content 271, and confirms the modification of the local placement target for the distributed digital signage content 271 with the digital signage player 200A by sending a confirm message 851. The confirm message 851 is received by the communication interface 230 of the digital signage player 200A. The digital signage player 200A stores in memory 220 the received modified placement target to be applied locally for the distributed digital signage content 271, and the processing unit 210 of the digital signage player 200A proceed with modifying the local placement target for the distributed digital signage content 271 in step 855.

FIG. 8 depicts coordination of the placement target for distributed digital signage content 271 between two digital signage players 200A and 200B. However, the present method, digital signage player and digital signage server are not limited to such a number. As each digital signage player has its own address, it is possible for the digital signage players to directly communicate with one each other, so as to negotiate local placement targets of the distributed digital signage content 271 based on the local operating conditions of each digital signage player.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for managing distributed digital signage content, the method comprising:
   storing in a memory of a digital signage player;
      a distributed digital signage content,
      a distributed digital signage content identifier for identifying the distributed digital signal content, and
      a local placement target for the distributed signage content;
   displaying by a processing unit of the digital signage player the distributed digital signage content on a display of the digital signage player in accordance with the local placement target;
   receiving by the processing unit of the digital signage player via a communication interface of the digital signage player a request from a neighbor signage player for increasing the local placement target for the distributed digital signage content based on operating conditions of the neighbor digital signage player, the request comprising the distributed digital signage content identifier;
   determining by the processing unit of the digital signage player that the local placement target can be increased by a local increase based on operating conditions of the digital signage player;
   transmitting by the processing unit of the digital signage player via the communication interface of the digital signage player a response to the request to the neighbor digital signage player, the response to the request comprising the local increase value of the local placement target;
   receiving by the processing unit of the digital signage player via the communication interface of the digital signage player a confirmation from the neighbor digital signage player, the confirmation comprising a neighbor decrease value of a neighbor placement target for the distributed digital signage content at the neighbor digital signage player; and increasing by the processing unit of the digital signage player the local placement target by the neighbor decrease value.

2. The method of claim 1, wherein the local placement target comprises a frequency of display of the distributed digital signage content.

3. The method of claim 1, further comprising:
receiving by the processing unit of the digital signage player via the communication interface the distributed digital signage content, the distributed digital signage content identifier, and an initial value for the local placement target from a digital signage server; and
storing by the processing unit of the digital signage player the received distributed digital signage content, the received distributed digital signage content identifier, and the received initial value for the local placement target in the memory.

4. The method of claim 1, further comprising:
receiving by a digital signage server the distributed digital signage content and a global placement target for the distributed digital signage content;
determining by a processing unit of the digital signage server the distributed digital signage content identifier, and an initial value of the local placement target based at least on the received global placement target;
transmitting to the digital signage player by the processing unit of the digital signage server the distributed digital signage content, the determined distributed digital signage content identifier and the determined initial value for the local placement target; and
storing by the processing unit of the digital signage player the received distributed digital signage content, the received distributed digital signage content identifier and the received initial value for the local placement target in the memory of the digital signage player.

5. A non-transitory, computer program product comprising instructions deliverable via, an electronically-readable media such as storage media and communication links, the instructions when executed by a processing unit of a digital signage player providing for managing distributed digital signage content by:
storing in a memory of the digital signage player:
a distributed digital signage content,
a distributed digital signage content identifier for identifying the distributed digital signal content, and
a local placement target for the distributed digital signage content;
displaying by the processing unit of the digital signage player the distributed digital signage content on a display of the digital signage player in accordance with the local placement target;
receiving by the processing unit of the digital signage player via a communication interface of the digital signage player a request from a neighbor digital signage player for increasing the local placement target for the distributed digital signage content based on operating conditions of the neighbor digital signage player, the request comprising the distributed digital signage content identifier;
determining by the processing unit of the digital signage player that the local placement target can be increased by a local increase value based on operating conditions of the digital signage player;
transmitting by the processing unit of the digital signage player via the communication interface of the digital signage player a response to the request to the neighbor digital signage player, the response to the request comprising the local increase value of the local placement target;
receiving by the processing unit of the digital signage player via the communication interface of the digital signage player a confirmation from the neighbor digital signage player, the confirmation comprising a neighbor decrease value of a neighbor placement target for the distributed digital signage content at the neighbor digital signage player; and
increasing by the processing unit of the digital signage player the local placement target by the neighbor decrease value.

6. The computer program product of claim 5, wherein the local placement target comprises a frequency of display of the distributed signage content.

7. The computer program product of claim 5, wherein the instructions when executed by the processing unit of the digital signage player further effect:
receiving by the processing unit of the digital signage player via the communication interface the distributed digital signage content, the distributed digital signage content identifier, and an initial value for the local placement target from a digital signage server; and
storing by the processing unit of the digital signage player the received distributed digital signage content, the received distributed digital signage content identifier, and the received initial value for the local placement target in the memory.

8. A digital signage player adapted for managing distributed digital signage content, comprising:
a communication interface;
memory for storing:
a distributed digital signage content,
a distributed digital signage content identifier for identifying the distributed digital signal content, and
a local placement target for the distributed digital signage content;
a display for displaying the distributed digital signage content; and
a processing unit for:
displaying the distributed digital signage content on the display in accordance with the local placement target;
receiving via the communication interface a request from a neighbor digital signage player for increasing the local placement target for the distributed digital signage content based on operating conditions of the neighbor digital signage player, the request comprising the distributed digital signage content identifier;
determining that the local placement target can be increased by a local increase value based on operating conditions of the digital signage player;
transmitting via the communication interface a response to the request to the neighbor digital signage player, the response to the request comprising the local increase value of the local placement target;
receiving via the communication interface a confirmation from the neighbor digital signage player, the confirmation comprising a neighbor decrease value of a neighbor placement target for the distributed digital signage content at the neighbor digital signage player; and
increasing the local placement target by the neighbor decrease value.

9. The digital signage player of claim 8, wherein the local placement target comprises a frequency of display of the distributed digital signage content.

10. The digital signage player of claim 8, wherein the processing unit:
- receives the distributed digital signage content, the distributed digital signage content identifier, and an initial value for the local placement target from a digital signage server via the communication interface, and
- stores the received distributed digital signage content, the received distributed digital signage content identifier, and the received initial value for the local placement target in the memory.

\* \* \* \* \*